US010794252B1

(12) United States Patent
Ker et al.

(10) Patent No.: US 10,794,252 B1
(45) Date of Patent: Oct. 6, 2020

(54) DIRECT SPRAY EXHAUST MIXER SYSTEM

(71) Applicant: Faurecia Emissions Control Technologies, USA, LLC, Columbus, IN (US)

(72) Inventors: Eric Ker, Columbus, IN (US); Anthony Burnett, Freetown, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/387,697

(22) Filed: Apr. 18, 2019

(51) Int. Cl.
| F01N 3/00 | (2006.01) |
| F01N 3/20 | (2006.01) |
| F01N 3/28 | (2006.01) |
| B01F 3/04 | (2006.01) |

(52) U.S. Cl.
CPC ........ F01N 3/2066 (2013.01); B01F 3/04021 (2013.01); F01N 3/2803 (2013.01); F01N 3/2839 (2013.01); F01N 2610/02 (2013.01); F01N 2610/1453 (2013.01)

(58) Field of Classification Search
CPC ... B01F 3/04021; F01N 3/2803; F01N 3/2839
USPC .......................................................... 60/274
See application file for complete search history.

(56) References Cited

U.S. PATENT DOCUMENTS

| 7,448,207 B2 | 11/2008 | Jozsa et al. |
| 7,842,266 B2 | 11/2010 | Takahashi et al. |
| 8,171,722 B2 * | 5/2012 | Rodman ............. B01F 3/04049 239/533.3 |
| 9,482,132 B2 | 11/2016 | Munnannur et al. |
| 9,719,386 B2 * | 8/2017 | Fan ........................ F01N 3/2066 |
| 2011/0219745 A1 * | 9/2011 | Griffin .................. B01F 5/0618 60/274 |
| 2012/0096838 A1 * | 4/2012 | Sandberg ............ B01F 3/04049 60/274 |
| 2013/0152555 A1 * | 6/2013 | Bui ........................ F01N 3/2066 60/295 |
| 2014/0053538 A1 * | 2/2014 | Reeves ................ B01F 5/0616 60/286 |
| 2018/0142597 A1 | 5/2018 | Riepshoff et al. |

FOREIGN PATENT DOCUMENTS

| EP | 2348204 A1 | 7/2011 |
| KR | 20010047050 A | 6/2001 |
| WO | 2013000640 A1 | 1/2013 |
| WO | 2013117230 A1 | 8/2013 |

* cited by examiner

*Primary Examiner* — Jason D Shanske

(74) *Attorney, Agent, or Firm* — Carlson, Gaskey & Olds, P.C.

(57) ABSTRACT

A mixer for a vehicle exhaust system includes an outer housing defining an exhaust gas flow path, wherein the outer housing includes an inlet opening and an outlet opening. A distribution pipe is configured to deliver a reduction fluid directly into the exhaust gas flow path. The distribution pipe has an inlet end associated with the inlet opening and an outlet end associated with the outlet opening. The distribution pipe comprises a fluid flow path that is coiled about a center of the exhaust gas flow path.

20 Claims, 1 Drawing Sheet

DIRECT SPRAY EXHAUST MIXER SYSTEM

TECHNICAL FIELD

This invention generally relates to a vehicle exhaust system that provides a direct spray of a reduction liquid or gas into an exhaust gas stream.

BACKGROUND OF THE INVENTION

An exhaust system conducts hot exhaust gases generated by an engine through various exhaust components to reduce emissions and control noise. In one traditional configuration, the exhaust system includes an injection system that injects a NOx reduction fluid such as urea, NH3 carbonate, or any reduction gas or liquid that is a solution of urea and water for example, upstream of a selective catalytic reduction (SCR) catalyst. The injection system includes a doser or injector that sprays the injected fluid into the exhaust stream. The spray is typically concentrated in one area and then spreads out to mix with the exhaust gases. The urea from the injected fluid should be transformed as much as possible into ammonia ($NH_3$) before reaching the SCR catalyst.

When large amounts of fluid are injected into the exhaust stream from a single injector it has a cooling effect and can result in fast cooling along the walls of the injection location. Further, the injection force can direct the fluid toward a certain location on the walls to form an impingement area. The fast cooling along the walls and at the impingement area can lead to urea deposit formation at these locations, which can adversely affect system performance. Further, current mixers can have an inherently high exhaust backpressure due to their current design configuration. The combination of high backpressure and deposit formation can lead to higher engine loads and inefficient utilization of reduction fluid.

SUMMARY OF THE INVENTION

In one exemplary embodiment, mixer for a vehicle exhaust system includes an outer housing defining an exhaust gas flow path, wherein the outer housing includes an inlet opening and an outlet opening. A distribution pipe is configured to deliver a reduction fluid directly into the exhaust gas flow path. The distribution pipe has an inlet end associated with the inlet opening and an outlet end associated with the outlet opening. The distribution pipe comprises a fluid flow path that is coiled about a center of the exhaust gas flow path.

In a further embodiment of the above, the distribution pipe includes a plurality of orifices through which the reduction fluid is directly introduced into the exhaust gas flow path.

In a further embodiment of any of the above, coils of the fluid flow path have an increasing radius about the center of the exhaust gas flow path.

In a further embodiment of any of the above, the coils are substantially circular.

In a further embodiment of any of the above, one of the inlet and outlet ends of the distribution pipe extends from the inlet opening toward the center of the exhaust gas flow path to a radially innermost coil, and wherein the other of the inlet and outlet ends of the distribution pipe extends from a radially outermost coil to the outlet opening.

In a further embodiment of any of the above, an inlet tube extends outward of the housing from the inlet opening and an outlet tube extends outward of the housing from the outlet opening, and wherein the inlet end of the distribution pipe is in fluid communication with the inlet tube and the outlet end of the distribution pipe is in fluid communication with the outlet tube.

In a further embodiment of any of the above, the inlet tube and outlet tube are immediately adjacent to each other on one side of the housing.

In a further embodiment of any of the above, the inlet and outlet tubes extend parallel to each other at the inlet and outlet openings.

In a further embodiment of any of the above, the inlet and outlet tubes are fluidly connected to a fluid supply of the reduction fluid.

In a further embodiment of any of the above, the outer housing comprises an exhaust pipe.

In another exemplary embodiment, a vehicle exhaust system includes an upstream exhaust component having a housing defining an exhaust gas flow path, wherein the housing includes an inlet opening and an outlet opening, and a downstream exhaust component that includes an exhaust aftertreatment component, wherein the upstream component is connected to the downstream component. A distribution pipe is positioned within the upstream exhaust component and is configured to deliver a reduction fluid directly into the exhaust gas flow path. The distribution pipe has an inlet end associated with the inlet opening and an outlet end associated with the outlet opening, and the distribution pipe comprises a fluid flow path that is coiled about a center of the exhaust gas flow path.

In a further embodiment of any of the above, the inlet and outlet tubes are fluidly connected to a fluid supply of the reduction fluid.

In a further embodiment of any of the above, the distribution pipe includes a plurality of orifices through which the reduction fluid is directly introduced into the exhaust gas flow path.

In a further embodiment of any of the above, the coils are substantially circular, and wherein coils of the fluid flow path have an increasing radius about the center of the exhaust gas flow path.

In a further embodiment of any of the above, one of the inlet and outlet ends of the distribution pipe extends from the inlet opening toward the center of the exhaust gas flow path to a radially innermost coil, and wherein the other of the inlet and outlet ends of the distribution pipe extends from a radially outermost coil to the outlet opening.

In a further embodiment of any of the above, an inlet tube extends outward of the housing from the inlet opening and an outlet tube extends outward of the housing from the outlet opening, and wherein the inlet end of the distribution pipe is in fluid communication with the inlet tube and the outlet end of the distribution pipe is in fluid communication with the outlet tube.

In a further embodiment of any of the above, the inlet and outlet tubes are fluidly connected to a fluid supply of the reduction fluid, and wherein the inlet tube and outlet tube are immediately adjacent to each other on one side of the housing such that the inlet and outlet tubes extend parallel to each other at the inlet and outlet openings.

In another exemplary embodiment, a method includes: providing an outer housing that defines an exhaust gas flow path, wherein the outer housing includes an inlet opening and an outlet opening; associating an inlet end of a distribution pipe with the inlet opening; associating an outlet end of a distribution pipe with the outlet opening, wherein the distribution pipe comprises a fluid flow path that is coiled about a center of the exhaust gas flow path; and forming a plurality of orifices in the distribution pipe along the fluid flow path such that reduction fluid enters through the inlet end and is directly introduced into the exhaust gas flow path via the plurality of orifices with any remaining fluid exiting the outlet end.

In a further embodiment of any of the above, the method further includes extending one of the inlet and outlet ends of the distribution pipe from the inlet opening toward the center of the exhaust gas flow path and to a radially innermost coil, and extending the other of the inlet and outlet ends of the distribution pipe from a radially outermost coil to the outlet opening.

In a further embodiment of any of the above, the method further includes extending an inlet tube outward of the outer housing from the inlet opening and extending an outlet tube outward of the outer housing from the outlet opening, and fluidly connecting the inlet and outlet tubes to a fluid supply of the reduction fluid.

These and other features of the present invention can be best understood from the following specification and drawings, the following of which is a brief description.

DETAILED DESCRIPTION

Figure 1:
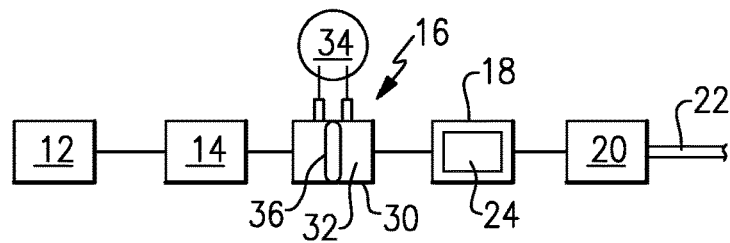
FIG. 1 is a schematic view of a vehicle exhaust system with a mixer incorporating the subject invention.

A vehicle exhaust system 10 includes an engine 12 that generates exhaust gases that are conveyed through various upstream exhaust components 14. The upstream exhaust components 14 can include components such as pipes and exhaust aftertreatment components such as particulate filters, catalysts, etc. In one example configuration, the upstream exhaust components 14 are connected to a mixer 16 that is used to direct a mixture of reduction fluid and engine exhaust gases into a downstream exhaust aftertreatment component 18 such as a catalyst substrate 24, e.g. a SCR substrate, for example. Downstream of the exhaust aftertreatment component 18 there may be various additional downstream exhaust components 20. The various downstream exhaust components 20 can include one or more of pipes, mufflers, resonators, etc. The downstream exhaust components 20 direct the exhaust gases to an outlet to atmosphere via a tailpipe 22. These upstream 14 and downstream 20 components can be mounted in various different configurations and combinations dependent upon the type of application and available packaging space.

The mixer 16 includes an outer housing 30 that has an internal open cavity 32 that defines an exhaust gas flow path F. In one example, the outer housing 30 comprises a pipe or a tube. In the example shown, the pipe or tube has a circular cross-section. A fluid supply 34 is used to supply a NOx reduction fluid such as urea, NH3 carbonate, or any reduction gas or liquid that is a solution of urea and water, for example, directly into the exhaust gas flow path such that the fluid can mix with the exhaust gas prior to entering the exhaust aftertreatment component 18. A distribution pipe 36 is in fluid communication with the fluid supply 34 to directly introduce the fluid into the exhaust gas flow path.

Figure 2:
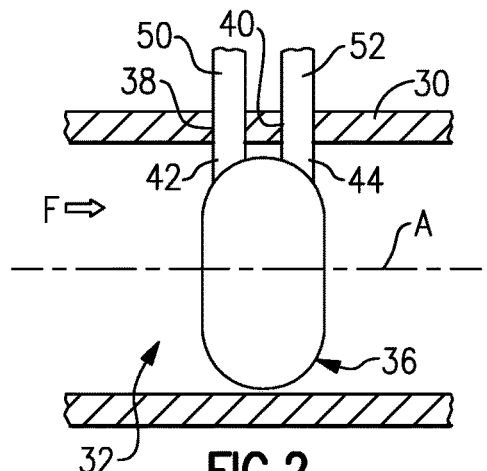
FIG. 2 is a schematic side view of the mixer of FIG. 1.
Figure 3:
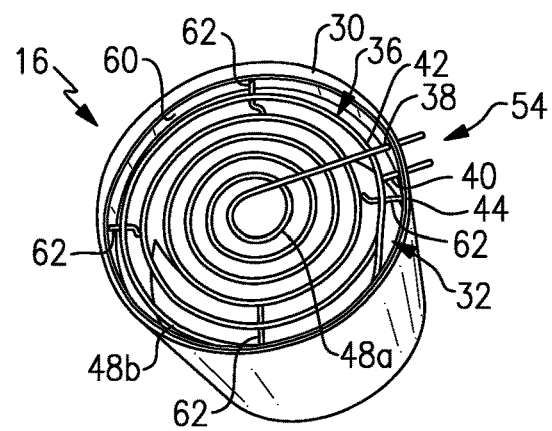
FIG. 3 is a perspective view of the mixer of FIG. 1.
Figure 4:
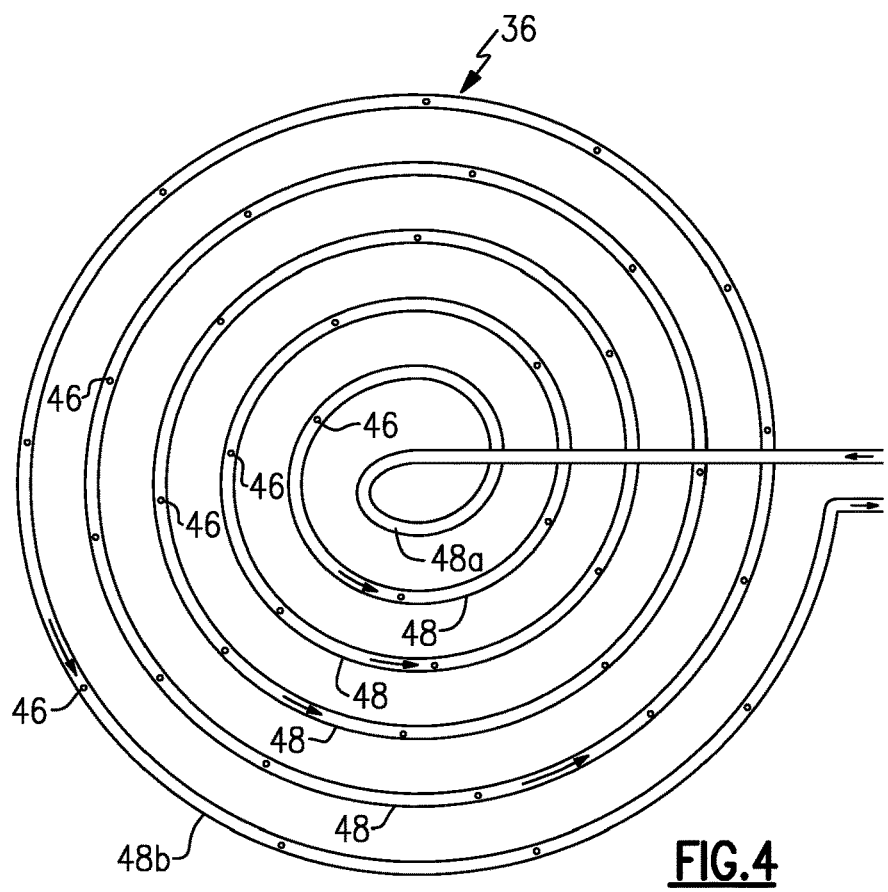
FIG. 4 is an end view of a distribution pipe of the mixer of FIG. 3.

The outer housing 30 has a center axis A and defines the exhaust gas flow path F as shown in FIG. 2. The outer housing 30 includes an inlet opening 38 and an outlet opening 40 that are in fluid communication with the fluid supply 34. The distribution pipe 36 has an inlet end 42 associated with the inlet opening 38 and an outlet end 44 associated with the outlet opening 40. As shown in FIGS. 3-4 the distribution pipe 36 comprises a fluid flow path that is coiled about a center of the exhaust gas flow path F. As shown in FIG. 4, the distribution pipe 36 includes a plurality of orifices 46 through which the reduction fluid is directly introduced into the exhaust gas flow path.

In one example, coils 48 of the distribution pipe 36 that form the fluid flow path have an increasing radius about the center of the exhaust gas flow path F. In one example, the coils 48 are substantially circular.

In one example, as shown in FIG. 3, the inlet end 42 of the distribution pipe 36 extends from the inlet opening 38 toward the center of the exhaust gas flow path F to a radially innermost coil 48a, and the outlet end 44 of the distribution pipe 36 extends from a radially outermost coil 48b to the outlet opening 40. In an optional arrangement, the inlet end could comprise the outlet end and vice versa.

As shown in FIG. 3, there is an inlet tube 50 that extends outward of the housing 30 from the inlet opening 38 and an outlet tube 52 that extends outward of the housing 30 from the outlet opening 40. The inlet 50 and outlet 52 tubes are fluidly connected to the fluid supply 34 of the reduction fluid. The inlet end 42 of the distribution pipe 36 is in fluid communication with the inlet tube 50 and the outlet end 44 of the distribution pipe 36 is in fluid communication with the outlet tube 52. In one example, the inlet tube 50 and outlet tube 52 are immediately adjacent to each other on one side of the housing 30. In this example, the inlet 50 and outlet 52 tubes extend parallel to each other at the inlet 38 and outlet 40 openings as indicated at 54. In other example embodiments, the inlet 50 and outlet 52 tubes can also be apart from each other at any angle depending on vehicle mounting space limitation.

As shown in FIG. 3, an inner collar 60 is positioned at an inner surface of the housing 30. One or more supports 62 extend inwardly from the collar 60 to provide support for the distribution pipe 36. The supports 62 extend in a radially inward direction from the collar 60 and can have varying radial lengths to support different coils 48 of the distribution pipe 36 as needed. The supports 62 allow the outermost coil 48b to be spaced inwardly of the inner surface of the housing 30 such that no part of the outermost coil 48 is in contact with the inner surface of the housing 30.

The subject invention provides a direct spray system with a distribution pipe 36 to spray NOx reduction liquid or gas into the exhaust gas stream. The subject invention comprises a configuration that simplifies reduction fluid mixing so that there is no surface impingement prior to introduction of the mixture of fluid and exhaust gas into the SCR catalyst. Thus, this eliminates deposit formation and reduces exhaust backpressure.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer for a vehicle exhaust system comprising:
an outer housing defining an exhaust gas flow path, wherein the outer housing includes an inlet opening and an outlet opening; and a distribution pipe configured to deliver a reduction fluid directly into the exhaust gas flow path, wherein the distribution pipe has an inlet end associated with the inlet opening and an outlet end associated with the outlet opening, and wherein the distribution pipe comprises a fluid flow path that is coiled about a center of the exhaust gas flow path.

2. The mixer according to claim 1 wherein the distribution pipe includes a plurality of orifices through which the reduction fluid is directly introduced into the exhaust gas flow path.

3. The mixer according to claim 1 wherein coils of the fluid flow path have an increasing radius about the center of the exhaust gas flow path.

4. The mixer according to claim 3 wherein the coils are circular.

5. The mixer according to claim 3 wherein one of the inlet and outlet ends of the distribution pipe extends from the inlet opening toward the center of the exhaust gas flow path to a radially innermost coil, and wherein the other of the inlet and outlet ends of the distribution pipe extends from a radially outermost coil to the outlet opening.

6. The mixer according to claim 1 including an inlet tube extending outward of the housing from the inlet opening and an outlet tube extending outward of the housing from the outlet opening, and wherein the inlet end of the distribution pipe is in fluid communication with the inlet tube and the outlet end of the distribution pipe is in fluid communication with the outlet tube.

7. The mixer according to claim 6 wherein the inlet tube and outlet tube are immediately adjacent to each other on one side of the housing.

8. The mixer according to claim 7 wherein the inlet and outlet tubes extend parallel to each other at the inlet and outlet openings.

9. The mixer according to claim 7 wherein the inlet and outlet tubes are fluidly connected to a fluid supply of the reduction fluid.

10. The mixer according to claim 1 wherein the outer housing comprises an exhaust pipe.

11. A vehicle exhaust system comprising:
an upstream exhaust component having a housing defining an exhaust gas flow path, wherein the housing includes an inlet opening and an outlet opening;
a downstream exhaust component that includes an exhaust aftertreatment component, wherein the upstream component is connected to the downstream component; and
a distribution pipe positioned within the upstream exhaust component and configured to deliver a reduction fluid directly into the exhaust gas flow path, wherein the distribution pipe has an inlet end associated with the inlet opening and an outlet end associated with the outlet opening, and wherein the distribution pipe comprises a fluid flow path that is coiled about a center of the exhaust gas flow path.

12. The vehicle exhaust system according to claim 11 wherein the inlet end and the outlet end are fluidly connected to a fluid supply of the reduction fluid.

13. The vehicle exhaust system according to claim 11 wherein the distribution pipe includes a plurality of orifices through which the reduction fluid is directly introduced into the exhaust gas flow path.

14. The vehicle exhaust system according to claim 13 wherein coils of the fluid flow path have an increasing radius about the center of the exhaust gas flow path, and wherein the coils are circular.

15. The vehicle exhaust system according to claim 13 wherein coils of the fluid flow path have an increasing radius about the center of the exhaust gas flow path, and wherein one of the inlet and outlet ends of the distribution pipe extends from the inlet opening toward the center of the exhaust gas flow path to a radially innermost coil, and wherein the other of the inlet and outlet ends of the distribution pipe extends from a radially outermost coil to the outlet opening.

16. The vehicle exhaust system according to claim 15 including an inlet tube extending outward of the housing from the inlet opening and an outlet tube extending outward of the housing from the outlet opening, and wherein the inlet end of the distribution pipe is in fluid communication with the inlet tube and the outlet end of the distribution pipe is in fluid communication with the outlet tube.

17. The vehicle exhaust system according to claim 16 wherein the inlet and outlet tubes are fluidly connected to a fluid supply of the reduction fluid, and wherein the inlet tube and outlet tube are immediately adjacent to each other on one side of the housing such that the inlet and outlet tubes extend parallel to each other at the inlet and outlet openings.

18. A method comprising:
providing an outer housing that defines an exhaust gas flow path, wherein the outer housing includes an inlet opening and an outlet opening;
associating an inlet end of a distribution pipe with the inlet opening;
associating an outlet end of the distribution pipe with the outlet opening, wherein the distribution pipe comprises a fluid flow path that is coiled about a center of the exhaust gas flow path; and
forming a plurality of orifices in the distribution pipe along the fluid flow path such that reduction fluid enters through the inlet end and is directly introduced into the exhaust gas flow path via the plurality of orifices with any remaining fluid exiting the outlet end.

19. The method according to claim 18 wherein coils of the fluid flow path have an increasing radius about the center of the exhaust gas flow path, and including extending one of the inlet and outlet ends of the distribution pipe from the inlet opening toward the center of the exhaust gas flow path and to a radially innermost coil, and extending the other of the inlet and outlet ends of the distribution pipe from a radially outermost coil to the outlet opening.

20. The method according to claim 18 including extending an inlet tube outward of the outer housing from the inlet opening and extending an outlet tube outward of the outer housing from the outlet opening, and fluidly connecting the inlet and outlet tubes to a fluid supply of the reduction fluid.

* * * * *